(12) United States Patent
Keys

(10) Patent No.: US 7,212,497 B2
(45) Date of Patent: May 1, 2007

(54) METHOD AND DRIVER FOR DETECTING GLITCHES

(76) Inventor: John S. Keys, 14025 SW. Cherryhill Dr., Beaverton, OR (US) 97008

( * ) Notice: Subject to any disclaimer, the term of this patent is extended or adjusted under 35 U.S.C. 154(b) by 926 days.

(21) Appl. No.: 09/741,405

(22) Filed: Dec. 19, 2000

(65) Prior Publication Data
US 2002/0110150 A1  Aug. 15, 2002

(51) Int. Cl.
*H04L 12/26* (2006.01)

(52) U.S. Cl. .................. 370/252; 709/224; 710/15

(58) Field of Classification Search .......... 370/242, 370/243, 244, 245, 248, 252, 434, 435; 709/224; 710/15–19
See application file for complete search history.

(56) References Cited

U.S. PATENT DOCUMENTS

| | | | | |
|---|---|---|---|---|
| 5,526,353 A | * | 6/1996 | Henley et al. | 370/392 |
| 5,550,802 A | * | 8/1996 | Worsley et al. | 370/252 |
| 5,742,623 A | * | 4/1998 | Nuber et al. | 714/798 |
| 5,923,655 A | * | 7/1999 | Veschi et al. | 370/394 |
| 5,936,979 A | * | 8/1999 | Jyrkka | 714/763 |
| 6,011,784 A | * | 1/2000 | Brown et al. | 370/329 |
| 6,044,081 A | * | 3/2000 | Bell et al. | 370/401 |
| 6,064,805 A | * | 5/2000 | McCrory et al. | 709/227 |
| 6,216,052 B1 | * | 4/2001 | Gulick | 700/94 |
| 6,504,838 B1 | * | 1/2003 | Kwan | 370/352 |
| 6,658,027 B1 | * | 12/2003 | Kramer et al. | 370/516 |
| 6,754,342 B1 | * | 6/2004 | Surazski et al. | 379/421 |
| 6,757,367 B1 | * | 6/2004 | Nicol | 379/90.01 |

OTHER PUBLICATIONS

"Universal Serial Bus Specification 1.1," Sep. 23, 1998. pp. 42, 62-64, 70, and 71.*

* cited by examiner

*Primary Examiner*—Seema S. Rao
*Assistant Examiner*—Donald L Mills
(74) *Attorney, Agent, or Firm*—Joni D. Stutman-Horn

(57) ABSTRACT

A driver and methods therefore provide automated testing of USB client devices in real-time. The driver may use the layered driver or filter driver feature in Microsoft® Windows® Driver Model (WDM) layered architecture for the Microsoft Windows operating system. The driver may be inserted between the USB bus driver and the USB client driver stack. The driver may intercept, inspect, and modify the requests between the client drivers and the bus driver.

13 Claims, 5 Drawing Sheets

METHOD AND DRIVER FOR DETECTING GLITCHES

BACKGROUND

1. Field

The subject matter described herein relates generally to the transfer of information in a computer system and, more particularly, to a driver and method therefore that provides real-time access to a host-side Universal Serial Bus (USB) command and data traffic.

2. Background

In USB isochronous data transfer, a device-specific driver sends data transfer requests to the USB bus driver. A set amount of data at 1 millisecond (1 USB frame) intervals, referred to as a USB isochronous data stream, is transferred between a host and a client device. For example, the host can be a personal computer and the client device can be an audio player and speakers.

The perceived quality of USB audio depends on the regularity of this service. A gap in the data stream itself, or an irregularity in the actual data, may cause an artifact in the audio as rendered by a speaker. This artifact is commonly referred to as a glitch.

Fault detection may be done either with dedicated hardware, by listening to the rendered audio stream, or by recording the audio stream and then using post-processing to detect faults.

The dedicated hardware method uses a USB device programmed to represent itself as some other type of USB device, such as, a pair of USB speakers. The device then monitors the incoming data stream in order to identify the faults. In this approach, emulation of a device is used in place of the real device.

Listening to the rendered audio stream requires an operator to listen to the real-time audio.

Recording and post-processing the audio stream is not done in real time. This makes identification of the fault difficult. The recording step reduces the reliability of the data.

DETAILED DESCRIPTION

One aspect of the present system defines testing of USB client devices in real-time. A driver may provide real-time access to host-side USB command and data traffic. The driver may use the layered driver or filter driver feature in Microsoft® Windows® Driver Model (WDM) layered architecture for the Microsoft Windows operating system. The driver may be inserted between the USB bus driver 104 and the USB client driver stack 102. The driver may intercept, inspect, and modify the requests between the client drivers and the bus driver.

Figure 1:
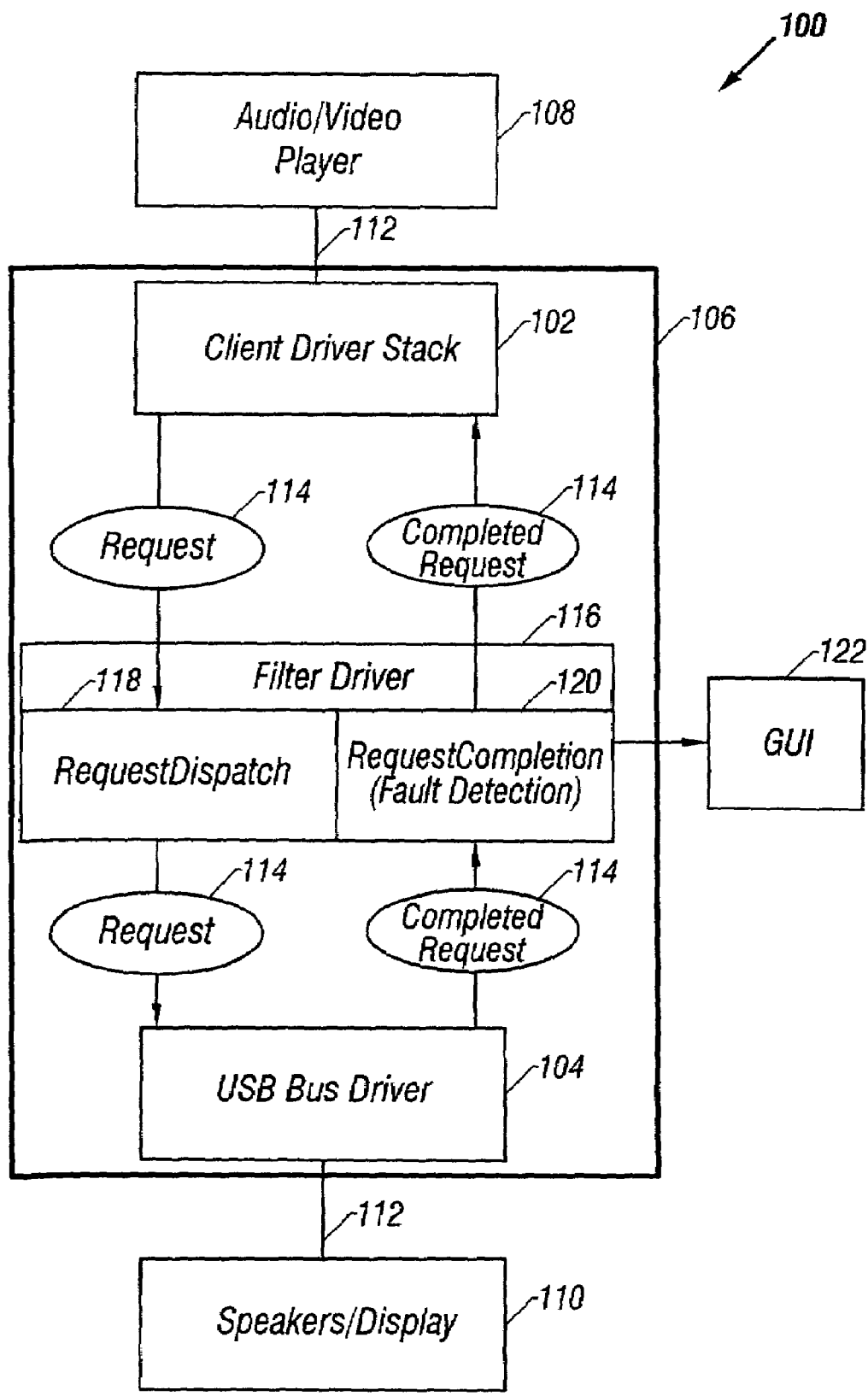
FIG. 1 is a block diagram of a computer system employing WDM.

FIG. 1 is a block diagram of a computer system 100 employing WDM. A client driver stack 102, and USB bus driver 104, may be WDM drivers implemented in software and executed on a host 106. The host may be a personal computer or other device employing WDM. Client devices, for example, an audio player 108 and speakers 110, may be coupled with the host via USB connectors 112.

In an isochronous data transfer between the audio player 108 and the speakers 110, the audio player 108 may send data transfer requests 114 to the USB bus driver 104. A driver 116 between the client driver stack 108 and the USB bus driver 104 may monitor the data transfer requests. A request dispatch module 118 may monitor the data transfer requests as they are sent to the bus driver, and a request completion module 120 may monitor the data transfer requests as the bus driver completes them.

The driver 116 monitors the data stream by examining the status of each transfer request as the request is completed. By examining the fields in the completed transfer request, the driver can determine the specific USB frame at which the transfer began and the duration of the transfer in USB frames. The duration implies when the next transfer should begin. By keeping running statistics of starting frames and the number of frames in an isochronous data transfer, the driver can identify frames in which no data was transferred and therefore infer that an artifact was rendered.

The driver 116 may also monitor the actual data transferred to identify a single specific type of irregularity. For example, audio driver stacks may become starved for actual audio data. These drivers may attempt to keep the isochronous data stream full by sending silence data while they wait for actual audio data. This silence forms an irregularity in the data stream that may also result in a rendered artifact. The filter may examine the data corresponding to a data transfer request to determine if the data was actual audio data or silence data.

As faults of either type are identified, a record of the type, time, and duration of the fault may be sent to a function-specific graphical user interface 122 for user notification.

Figure 2:
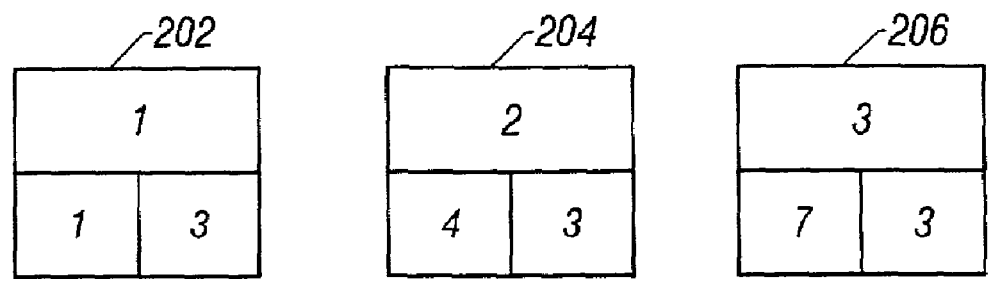
FIG. 2 is a diagram of data transfer requests.

FIG. 2 is a diagram of data transfer requests. Three related data transfer requests 202, 204, 206 are shown. The number in the upper portion of the block denotes the data transfer request number in a related series. The number in the lower left-hand portion of the block denotes the start frame in the packet corresponding to the data transfer request. The number in the lower right-hand portion of the block denotes the number of frames in the packet. For example the first data transfer request 202 in the series starts with frame one and has three frames in the packet. The second data transfer request 204 starts with frame four and has three frames in the packet.

Figure 3:
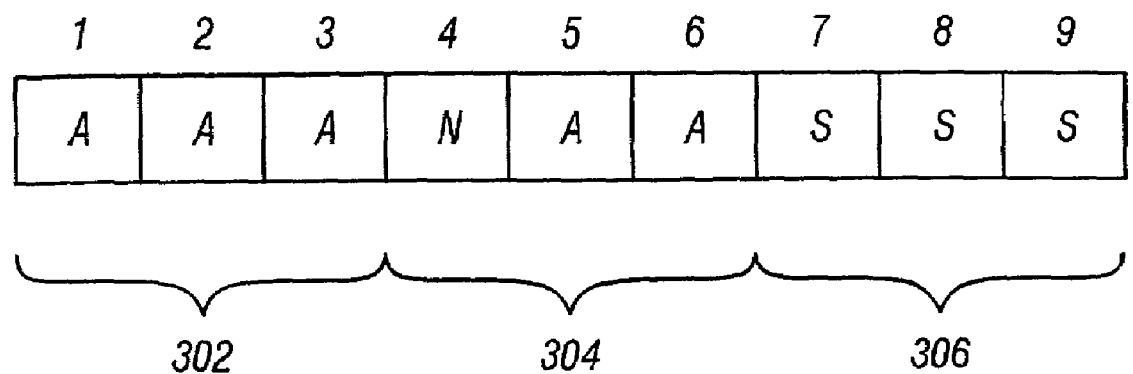
FIG. 3 is a diagram of isochronous data transfers corresponding to the data transfer requests shown in FIG. 2.

FIG. 3 is a diagram of isochronous data transfers having packets 302, 304, 306 corresponding to the data transfer requests 202, 204, 206, respectively, shown in FIG. 2. "A" denotes actual data in a frame; "N" denotes no data in a frame; and "S" denotes silence data in a frame.

Figure 4:
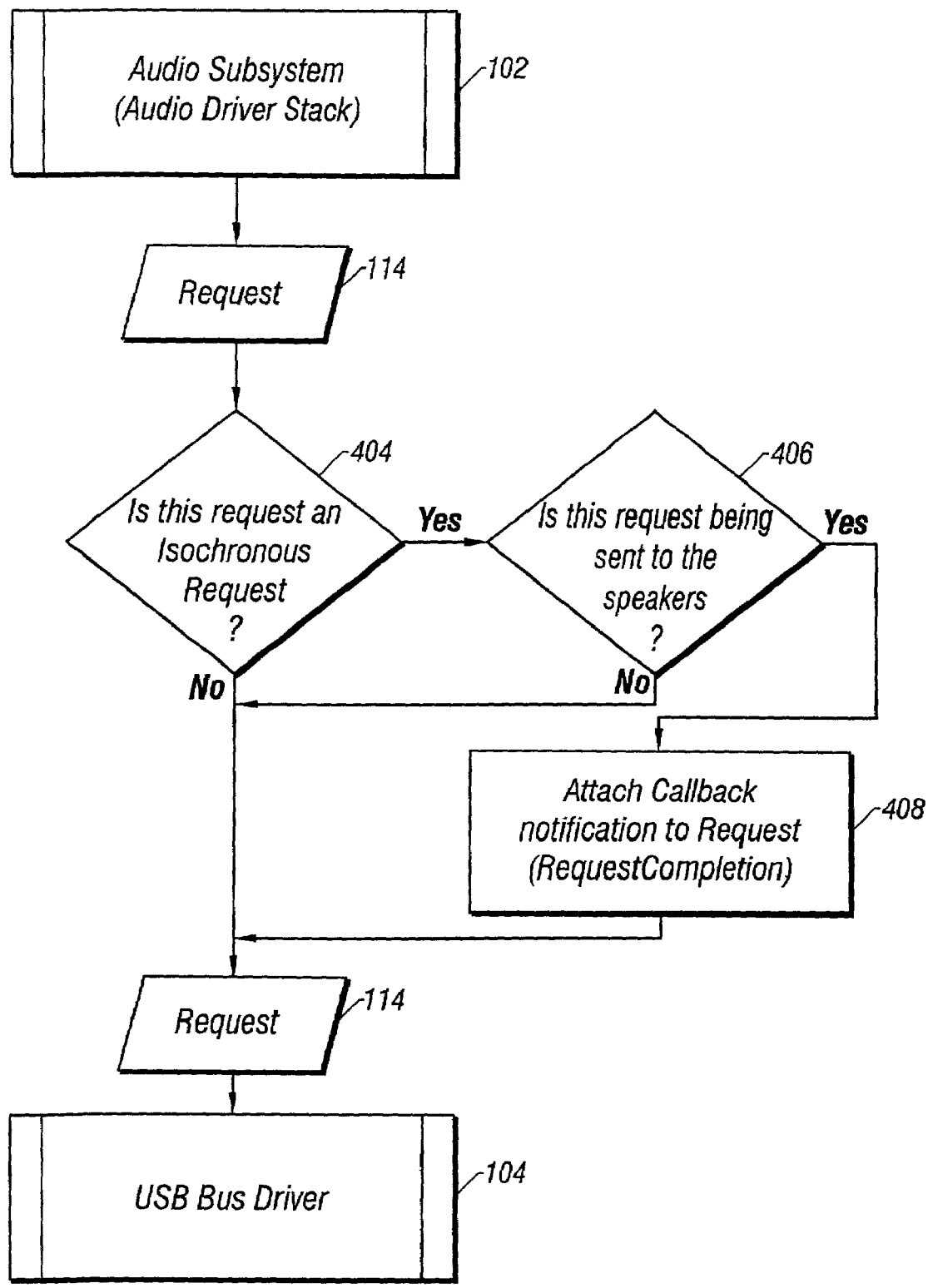
FIG. 4 is a flow diagram of a method of requesting data transfer.

FIG. 4 is a flow diagram of requesting data transfer. The client driver stack 102 sends a data transfer request 114. The request dispatch module 118 determines if the data transfer request is an isochronous data transfer request at 404. If the data transfer request is isochronous, then the request dispatch module determines if the data transfer request is being sent to a predetermined client device, for example, an audio speaker or a video display at 406. If the data transfer request is being sent to a predetermined client device, the request dispatch module attaches a callback notification to the data transfer request at 408. The callback notification informs the driver that the completed data transfer request is to be processed by the request completion module 120. If the request is either not isochronous in 404, or not being sent to the predetermined client device in 406, then the callback notification is not attached to the data transfer request.

Figure 5A:
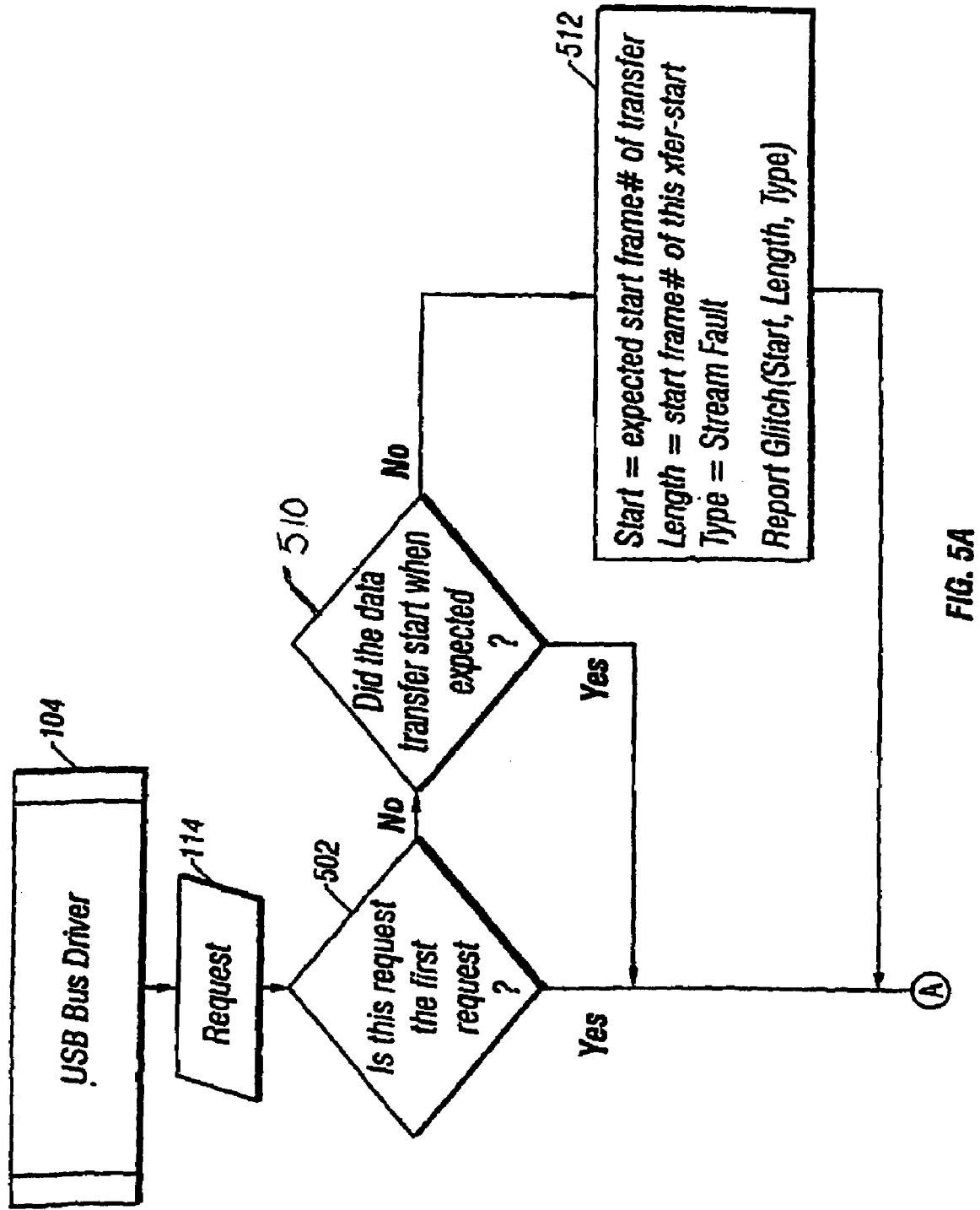
FIGS. 5A and 5B are flow diagrams of a method of completing a data transfer request.
Figure 5B:
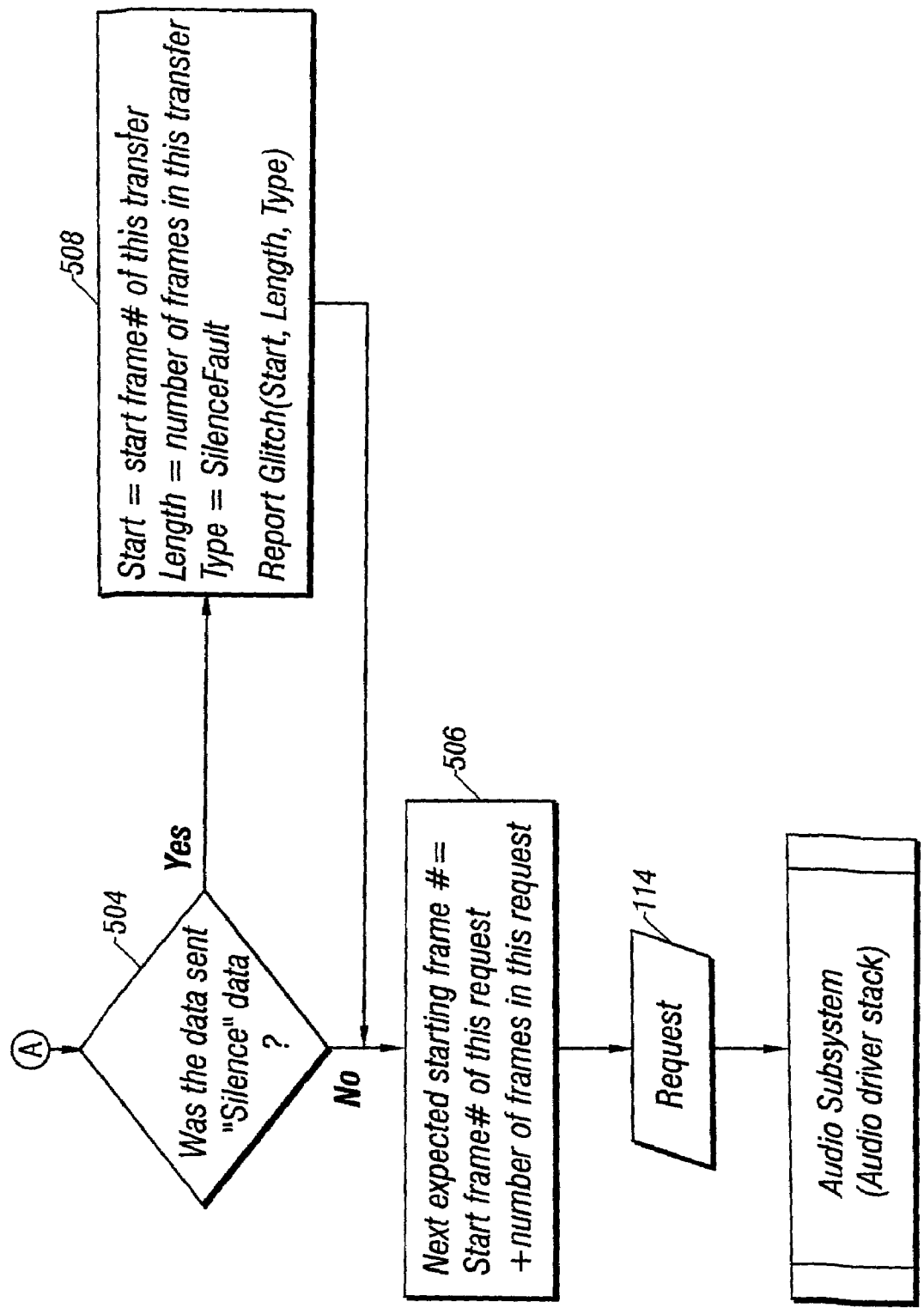

FIGS. 5A and 5B are flow diagrams that show completing a data transfer request that has a callback notification attached. The request completion module 120 determines if the data transfer request corresponding to a packet is a first data transfer request at 502. If the data transfer request is a first data transfer request, then the request completion module determines if the transferred data in the packet includes silence data at 504. This may be done by checking the data buffer in host memory. If the data is not silence data, then the request completion module determines the frame number of the expected start frame of the next packet to be sent at 506. The frame number of the expected start frame of the next packet can be determined from the start frame of the current request and from the number of frames in the current request.

When the transferred data in the packet is silence data, the request completion module reports a glitch as a silence fault at 508. In addition, the report can include the start frame of the packet and a number of frames in the packet. After the report, the frame number of the expected start frame of the next packet to be sent is determined.

When the data transfer request is not a first data transfer request, the request completion module determines whether the data transfer started when expected at 510. This can be done, for example, by determining the frame number of the actual start frame of the packet, and determining if the frame number of the actual start frame is equal to the frame number of the expected start frame.

When the frame number of the actual start frame is equal to the frame number of the expected start frame, the system determines if the transferred data in the packet is silence data at 504.

When the frame number of the actual start frame is not equal to the frame number of the expected start frame, the request completion module reports the glitch as a stream fault at 512 in an analogous way to that described above. In addition, the report can include the expected start frame and the actual start frame.

FIG. 2 shows three isochronous data transfer requests 202, 204, 206 with data transfer request 202 being the first data transfer request. FIG. 3 shows packet 302, corresponding to data transfer request 202, having a start frame number of one and with three frames in the packet all having actual data. No glitch report is sent since this packet represents the first data transfer request and all of its frames have actual data.

The next expected starting frame is determined to be frame four. The second packet, however, does not begin sending actual data until frame five. This is not the first data request and the data did not start when expected. Thus a stream fault is reported.

The next expected starting frame is determined to be frame seven. This third packet-contains silence data. According to the method, this is not the first data request, the data transfer started when expected, but the data sent was silence data. Thus a silence fault is reported.

The following presents exemplary code for the driver implemented using conventional means of driver calls:
RequestDispatch: Parameter request

```
BEGIN
    IF request is isochronous data transfer to target
            device
    THEN attach RequestCompletion completion routine to
            request
    ENDIF
    Pass request to next lower driver; (USB Bus Driver)
END
RequestCompletion; Parameter request
BEGIN
    IF request is NOT first request seen
    THEN
        IF request.StartFrame NotEqual
                NextExpectedStartFrame
            THEN GlitchStart = NextExpectedStartFrame
                GlitchDuration =
                    request.StartFrame − NextExpectedStartFrame
                GlitchType = StreamFault
                ReportGlitch (GlitchStart, GlitchDuration,
                    GlitchType)
        ENDIF
    ENDIF
    IF request Data is SilenceData
    THEN GlitchStart = request.StartFrame
        GlitchDuration = request.NumberOfFrames
        GlitchType = SilenceFault
        ReportGlitch (GlitchStart, GlitchDuration,
            GlitchType)
    ENDIF
    NextExpectedStartFrame =
            request.StartFrame + request.NumberOfFrames
END
```

The present invention may be capable of other and different embodiments, and its several details are capable of modification. For example, data streams to other predetermined client devices may be monitored, such as, a video data stream sent to a video screen.

In conclusion, the driver and methods described herein provides automated testing of USB client devices in real-time.

A number of embodiments of the invention have been described. Nevertheless, it may be understood that various modifications may be made without departing from the spirit and scope of the invention. Accordingly, other embodiments are within the scope of the following claims.

What is claimed is:

1. A method of detecting glitches in an isochronous data transfer, comprising:

a filter driver providing real-time access to USB command and packet data traffic between a host and predetermined client device;

determining, by the filter driver, if transferred data in a packet is silence data, wherein silence data comprises rendered data to keep the data transfer full of data when an interval has no audio data, the silence data forming an irregularity in the data transfer, and wherein the filter driver is configured between a USB bus driver and a USB client driver stack;

monitoring, by the filter driver, the transferred data packets, the monitoring including examining a status of each data packet transfer between the host and client device; and reporting a silence fault for user notification when the transferred data is silence data, wherein the silence fault comprises information to determine a frame number of an expected start frame of a next packet to be sent, and wherein determining the frame number of the expected start frame of the next packet to be sent is calculated from a start frame of the silence data packet causing the silence fault and a number of frames in the silence data packet.

2. The method of claim 1 further comprising:

determining if a data transfer request corresponding to the packet is an isochronous data transfer request;

determining if the data transfer request is being sent to the predetermined client device when the data transfer request is an isochronous data transfer request; and attaching a callback notification to the data transfer request when the data transfer request is being sent to the predetermined client device, wherein the callback notification is configured to inform the filter driver that a completed data transfer request is to be processed by the filter driver.

3. The method of claim 1 further comprising:

determining a frame number of an expected start frame of the packet;

determining if a data transfer request corresponding to the packet is a first data transfer request;

when the data transfer request is not a first data transfer request, determining a frame number of an actual start frame of the packet, and determining if the frame number of the actual start frame is equal to the frame number of the expected start frame; and reporting a stream fault for user notification when the frame number of the actual start frame is not equal to the frame number of the expected start frame.

4. The method of claim 3 further comprising reporting the expected start frame and the actual start frame.

5. The method of claim 1 further comprising reporting a start frame of the packet and a number of frames in the packet.

6. A filter driver comprising:

a request dispatch module for, determining if a data transfer request corresponding to a packet is an isochronous data transfer request, determining if the data transfer request is being sent to a predetermined client device when the data transfer request is an isochronous data transfer request, and attaching a callback notification to the data transfer request when the data transfer request is being sent to the predetermined client device, wherein the callback notification is configured to inform a filter driver comprising request completion module that a completed data transfer request is to be processed by the request completion module, wherein the filter driver is configured between a USB bus driver and a USB client driver stack; and the request completion module for, determining a frame number of an expected start frame of the packet, determining if a data transfer request corresponding to the packet is a first data transfer request, and when the data transfer request is not a first data transfer request, determining a frame number of an actual start frame of the packet, and determining if the frame number of the actual start frame is equal to the frame number of the expected start frame, and reporting a stream fault when the frame number of the actual start frame is not equal to the frame number of the expected start frame, wherein the request completion module further for:

determining if transferred data in the packet is silence data, wherein silence data keeps the data transfer full of data when an interval has no audio data; and reporting a silence fault for user notification when the transferred data is silence data, wherein the silence fault comprises information to determine a frame number of an expected start frame of a next packet to be sent, and wherein determining the frame number of the expected start frame of the next packet to be sent is calculated from a start frame of the silence data packet causing the silence fault and a number of frames in the silence data packet.

7. A filter driver comprising:

means for determining if transferred data in a packet is silence data, wherein silence data keeps the data transfer full of data when an interval has no audio data; and means for reporting a silence fault for user notification when the transferred data is silence data, wherein the silence fault comprises information to determine a frame number of an expected start frame of a next packet to be sent, and wherein determining the frame number of the expected start frame of the next packet to be sent is calculated from a start frame of the silence data packet causing the silence fault and a number of frames in the silence data packet.

8. The filter of claim 7 further comprising:

means for determining a frame number of an expected start frame of the packet;

means for determining if a data transfer request corresponding to the packet is a first data transfer request;

means for determining a frame number of an actual stan frame of the packet and for determining if the frame number of the actual start frame is equal to the frame number of the expected start frame when the data transfer request is not a first data transfer request; and means for reporting a stream fault when the frame number of the actual start frame is not equal to the frame number of the expected start frame.

9. A computer program product embodied on a tangible storage medium, the program comprising executable instructions that enable a computer to:

determine if transferred data in a packet is silence data, wherein silence data keeps the data transfer full of data when an interval has no audio data; and report a silence fault for user notification when the transferred data is silence data, wherein the silence fault comprises information to determine a frame number of an expected start frame of a next packet to be sent, and wherein determining the frame number of the expected start frame of the next packet to be sent is calculated from a start frame of the silence data packet causing the silence fault and a number of frames in the silence data packet.

10. The computer program product of claim 9 further comprising executable instructions that enable a computer to:

determine if a data transfer request corresponding to the packet is an isochronous data transfer request;

determine if the data transfer request is being sent to a predetermined client device when the data transfer request is an isochronous data transfer request; and attach a callback notification to the data transfer request when the data transfer request is being sent to the predetermined client device, wherein the callback notification is configured to inform a filter driver that a completed data transfer request is to be processed by the filter driver.

11. The computer program product of claim 9 further comprising executable instructions that enable a computer to:
   determine a frame number of an expected start frame of the packet;
   determine if a data transfer request corresponding to the packet is a first data transfer request;
   when the data transfer request is not a first data transfer request,
      determine a frame number of an actual start frame of the packet, and
      determine if the frame number of the actual stan frame is equal to the frame number of the expected start frame; and
   report a stream fault when the frame number of the actual start frame is not equal to the frame number of the expected start frame.

12. The computer program product of claim 11 further comprising executable instructions that enable a computer to report the expected start frame and the actual start frame.

13. The computer program product of claim 9 further comprising executable instructions that enable a computer to report a start frame of the packet and a number of frames in the packet.

* * * * *